United States Patent [19]

Lin

[11] Patent Number: 4,668,355

[45] Date of Patent: May 26, 1987

[54] SOLUTIONS FOR EXTRACTING MAGNETIC PARTICLES

[75] Inventor: Lifun Lin, Hamden, Conn.

[73] Assignee: Olin Corporation, New Haven, Conn.

[21] Appl. No.: 773,769

[22] Filed: Sep. 9, 1985

[51] Int. Cl.[4] ............................................. C25F 5/00
[52] U.S. Cl. ............................................. 204/146
[58] Field of Search .................................. 204/146

[56] References Cited

U.S. PATENT DOCUMENTS

| | | | |
|---|---|---|---|
| 3,649,489 | 3/1972 | Dillenberg | 204/146 |
| 4,257,830 | 3/1981 | Tsuya et al. | 148/112 |
| 4,274,865 | 6/1981 | Suzuki et al. | 75/0.5 AA |
| 4,290,799 | 9/1981 | Schroeder et al. | 75/0.5 A |
| 4,404,074 | 9/1983 | Tomaszewski | 204/146 |
| 4,461,685 | 7/1984 | Pryor | 204/146 |

FOREIGN PATENT DOCUMENTS 133638  8/1946  Australia ............................ 204/146

Primary Examiner—T. M. Tufariello
Attorney, Agent, or Firm—Barry L. Kelmachter; Howard M. Cohn; Paul Weinstein

[57] ABSTRACT

The present invention relates to solutions for extracting magnetic particles from a surrounding matrix. The solutions extract the magnetic particles by dissolving the surrounding matrix and leaving the magnetic particles. Useful solutions include aqueous citrate solutions and aqueous solutions containing free ammonia. The magnetic particles produced using the solutions of the present invention have particular utility in magnetic recording media.

12 Claims, No Drawings

SOLUTIONS FOR EXTRACTING MAGNETIC PARTICLES

The present application is related to co-pending U.S. patent application Ser. No. 773,484, filed on an even date herewith, to Crane et al. which has been abandoned in favor of co-pending continuation-in-part application Ser. No. 803,379, filed Dec. 2, 1985, to Crane et al.

The present invention relates to a method for producing magnetic particles to be used for magnetic recording media.

The goal of magnetic recording technology is to write a magnetization pattern onto a magnetic medium and then read the pattern at some later time. The essential components of a recording system are the read-/write head, the magnetic medium, the mechanical systems which manipulate the head and/or the media, and the electronics which process the input and output signals. The magnetic medium is typically a dispersion of ferromagnetic particles in an organic binder which is coated onto a substrate. The substrate can be a polyester such as MYLAR for flexible media or metal such as aluminum alloy 7075 for rigid disks.

The requirements for such magnetic media include: (1) that the magnetization direction of the media can be altered by the head during writing; and (2) that a large stable magnetization be retained for reading. The two most important magnetic characteristics of the media are the magnetization which remains after the applied field is removed and the applied field necessary to reduce the net magnetization to zero. These are called the remanent magnetization and the coercive field, respectively.

Media with high magnetization are desired because all other things being equal, higher magnetization yields a higher signal to be read. In a well prepared media with preferentially aligned particles, the remanent magnetization is about 90% of the saturation magnetization. The magnetic stability of the media is a function of its coercive field. Generally, the coercive field is at some intermediate value between two limits defined by the following considerations. If the coercive field is too large, the magnetic field generated by the write head is insufficient to alter the media. If, however, the coercive field is too small, the media is easily demagnetized and the recorded pattern is not stable. Thus, the general aim in the development of new magnetic materials for recording purposes is to develop materials characterized by a relatively high coercive field and saturation magnetization.

Various magnetic powder materials have been proposed for use in preparing magnetic recording media. These materials include $\gamma$-$Fe_2O_3$, Co-doped $\gamma Fe_2O_3$, $Fe_3O_4$, Co-doped $Fe_3O_4$, $Fe_3O_4$-$\gamma$-$Fe_2O_3$, and $CrO_2$. However, the magnetic characteristics of these materials are generally insufficient to achieve the high density recordings sought by the recording industry. As a result, attention has focused on ferromagnetic metal and alloy materials as being most promising to achieve the aims of the recording industry.

U.S. Pat. Nos. 4,274,865 to Suzuki et al. and 4,290,799 to Schroeder et al. illustrate prior art processes for preparing ferromagnetic metal or alloy powder materials. In the Suzuki et al. approach, a magnetic powder consisting mainly of iron is produced by applying or adsorbing or depositing one or more compounds of zinc, chromium, and copper on a particulate iron oxyhydroxide or oxide material and then reducing the thus treated material with a reducing gas such as hydrogen to form a magnetic powder consisting mainly of iron. The Schroeder et al. approach produces a metal powder consisting essentially of acicular iron particles by precipitating and oxidizing an aqueous iron (II)-salt solution to produce finely divided acicular iron (III)-oxide-hydroxide; stabilizing the iron (III)-oxide-hydroxide by treatment with cadmium, lead, calcium, magnesium, zinc, aluminum, chromium, tungsten, a phosphorous oxide and/or a boron oxide; converting the stabilized material into ferromagnetic iron oxide; and reducing it to metallic iron with a gaseous reducing agent.

Other approaches for forming magnetic particles include vacuum evaporation, thermal decomposition of carbonyls, and reduction by borohydrides of iron in solution. Still another approach employs rapid solidification techniques to form thin metallic ribbons containing magnetic particles. In this approach, a melt containing magnetic material is formed and ejected under pressure onto a moving or rotating cooling substrate. As soon as the molten material contacts the cooling substrate, the melt quickly cools and solidifies into a thin ribbon. The magnetic particles are distributed therein. U.S. Pat. Nos. 4,257,830 to Tsuya et al. and 4,461,685 to Pryor illustrate the use of rapid solidification technology to form magnetic particles. While rapid solidification techniques produce magnetic particles of good quality, their primary deficiency is their inability to produce particles having identical or substantially similar sizes. From the standpoint of forming particles having substantially uniform magnetic properties, it is highly desirable to employ a technique that forms substantially uniformly sized magnetic particles. Particle size tends to define the magnetic properties of the particle and substantially identically sized particles exhibit substantially identical magnetic properties. Non-identical sized particles may cause unwanted noise problems.

The size and morphology of the magnetic particles can be used to control the magnetic properties of the particle. All other things being equal, it has been found that there is a critical size for maximum coercivity. At this critical size, particles are uniformly and permanently magnetized and are said to have a single magnetic domain. For iron particles at room temperature, this critical size is about 300 Å. Particles larger than the critical size contain a plurality of magnetic domains. Magnetization changes in multi-domain particles require less energy and therefore, have a lower coercive field than single domain particles. Particles smaller than the critical size are susceptible to thermal fluctuations in their magnetization direction which can spontaneously demagnetize a particle assemble. Particle morphology is important in that acicular single domain particles have been found to provide a higher coercive field than spherical particles. Furthermore, the magnetization direction tends to lie along the long axis of the particle. This shape anisotropy may be used to control the coercive field of magnetic recording particles. For example, the calculated coercive field of ellipsoidal iron particles with aspect ratios of 1.1:1 and 1.2:1 are about 700 Oe and 2000 Oe, respectively.

Accordingly, it is an object of the present invention to provide magnetic particles to be used in recording media.

It is a further object of the present invention to provide an improved method for forming such magnetic particles.

It is still a further object of the present invention to provide solutions for extracting such magnetic particles from a surrounding matrix.

These and further objects and advantages will become more apparent from the following description.

The present invention relates to certain solutions found to be particularly suitable for extracting magnetic particles from a surrounding matrix by dissolving the matrix and leaving the magnetic particles. These solutions have been found to be useful for a number of reasons. For example, they are capable of dissolving the matrix without significantly dissolving the magnetic particles. They are also capable of preventing displacement reactions between certain metal ions from the matrix and other metal species in the magnetic particles; and of maintaining the element dissolution products as soluble species. Still further, they are capable of forming a passive layer about the magnetic particles during dissolution of the matrix.

The solutions of the present invention include aqueous solutions containing inorganic complexing agents such as ammonia, cyanide and/or pyrophosphates and/or organic complexing agents such as formates, citrates and/or acetates. The type of solution to be used in a given situation depends upon the compositional nature of the matrix to be dissolved and the type of recovery process being employed. For example, it has been discovered that aqueous citrate solutions containing an alkaline metal citrate are quite useful in electrolytically recovering iron- and/or nickel-containing magnetic particles from a copper base alloy matrix containing a relatively high percentage of iron and/or nickel. These useful citrate solutions contain a citrate ion concentration in the range of about 0.5 M to about 3 M, preferably in the range of about 1 M to about 2 M. The solution may also contain copper if one desires to plate copper onto an electrode. Where used, copper is preferably present in the solution in an amount greater than about 0.3 M.

Where it is preferred to chemically recover the magnetic particles, it has been discovered that aqueous solutions containing free ammonia are quite useful. The free ammonia may be present in the solution in the form of an ammonium salt such as ammonium hydroxide. The concentration of ammonia in these solutions may be in the range of from about 0.5 M to about 3.5 M, preferably from about 1 M to about 2 M. In those instances where a copper matrix is to be dissolved, the solution may also contain from about 10 g/l to about 50 g/l, preferably from about 20 g/l to about 40 g/l, of copper. It is believed that the presence of copper in the ammonia solution helps form a copper-ammonia compress that beneficially acts as an electron acceptor and enhances the dissolution rate.

In a preferred embodiment of the present invention, the magnetic particles are formed using a thermal aging technique. The magnetic particles produced by this thermal aging technique and the dissolution technique of the present invention have been found to exhibit improvement in many of the features and properties desired by the recording industry. For example, the particles are acicular in shape, chemically stable, and tend to be single magnetic domain particles. The particles are further characterized by a relatively smooth surface which is significant from a magnetization per unit volume standpoint. Additionally, the particles are substantially uniform in size and composition. As previously discussed, the ability to produce nearly identical particles having a substantially uniform size and composition is very desirable from the standpoint of having particles with substantially uniform magnetic properties.

As discussed hereinbefore, the present invention relates to useful solutions for extracting magnetic particles from a surrounding matrix. The free magnetic particles produced by the present invention have particular use as recording media. While the invention will be described in detail with reference to a particular technique for forming the magnetic particles and with reference to a particular copper-base alloy starting material, it should be recognized that the present invention has broad application to a wide variety of magnetic particle forming techniques such as rapid solidification techniques and a wide variety of starting materials.

In accordance with a preferred embodiment, the magnetic particles are formed using a thermal treatment. The starting material is preferably one capable of forming a magnetic precipitate by thermal aging. The magnetic precipitate so formed is preferably characterized by the presence of acicular magnetic particles. Suitable starting materials include copper-base alloy systems such as copper-iron-nickel, copper-nickel-cobalt, and copper-iron-nickel-aluminum. Other suitable starting materials may include iron base alloy systems such as iron-chromium-cobalt, iron-nickel-aluminum, and iron-platinum; gold-base alloy systems such as gold-iron-nickel; manganese-base alloy systems; and nickel-base alloy systems. A particular alloy system which has been found to be quite useful for forming ferromagnetic particles is a copper base alloy containing about 10% to about 40% iron, about 10% to about 40% nickel and the balance essentially copper. If desired, the copper base alloy may contain up to 40% of cobalt, chromium, zirconium, and/or manganese either as additional elements or as substitutes for some of the iron and/or nickel content of the alloy. The foregoing percentages are weight percentages.

The starting material may be initially processed in any desired conventional manner into any desired form such as a strip material. For example, a base metal may be melted and desired alloying additions may be made to the melt in accordance with conventional practices. The melt may then be cast in any desired manner. After being cast, the starting material may be homogenized and quenched, hot worked such as by hot rolling, cold worked such as by cold rolling and/or subjected to one or more interanneals until the material has reached a desired gage. For example, the aforementioned copper base alloy may be processed as follows. After casting, the alloy may be homogenized at a temperature above about 1000° C. for about 30 minutes to about 350 hours, cooled to room temperature at a cooling rate that preferably doesn't impair subsequent cold workability, and then cold worked, e.g. cold rolled. This processing cycle may be repeated one or more times until the material reaches a desired gage. The foregoing processing steps may be carried out in any suitable manner known in the art.

After the material has been processed to the desired gage, the material is preferably solution heat treated and quenched. Both solution heat treatment and quenching of the material may be performed in any suitable manner known in the art. For the aforementioned coppernickel-iron alloy system, the solution heat treatment step may be performed at a temperature in the range of about 950° C. to about 1200° C. for a time in the range of about 10 minutes to about 48 hours. Preferably, the solution heat treatment is carried out at a temperature in the range of about 1000° C. to about 1100° C. for a time in the range of about 1 hour to about 24 hours. For certain alloy systems, the solution heat treating and quenching steps may be omitted since the quenching after hot working serves the same purpose.

The final step of the material processing comprises a thermal treatment of the material to produce magnetic particles. It has been surprisingly discovered that one can form a magnetic precipitate, preferably comprising acicular magnetic particles, by thermal aging of the processed starting material and that the magnetic and physical properties exhibited by these particles are significantly better than the properties of particles produced by other techniques. Any suitable thermal aging technique known in the art including isothermal aging, controlled cooling, and programmed temperature aging may be used to practice the present invention and form the magnetic precipitate. Of course, certain materials lend themselves to certain aging techniques and the choice of a particular aging technique may be limited by the material being processed. Preferably, the aging technique employed will form a magnetic precipitate comprising a plurality of acicular magnetic particles dispersed throughout a matrix.

For the copper-nickel-iron alloy sytem discussed above, aging separates the alloy into a copper-rich matrix and iron-nickel rich magnetic particles. It has been found that the magnetic particles typically contain copper in a significant amount up to about 20% by weight as well as iron and nickel. It is believed that this alloy system decomposes spinodally to form the two phases. For this copper-base alloy system, thermal aging may be carried out at a temperature in the range of about 550° C. to about 800° C., preferably at a temperature in the range of about 600° C. to about 700° C. for a time period up to about 48 hours, preferably a time in the range of about 1 to about 8 hours.

When processing certain alloy systems, it may be desirable to cold work, e.g. cold roll, the material just prior to the thermal aging step to effect the morphology and size of the particles and the type of precipitate to be formed. The degree of cold work applied to the material will of course depend upon the desired particle properties.

The magnetic precipitates are preferably recovered from the matrix by dissolving the matrix and collecting the free magnetic particles. Several useful solutions for extracting or removing these magnetic particles from the matrix have been identified. These solutions are useful because: (1) the dissolution products are kept as soluble species within a desired pH range; (2) they substantially prevent displacement reactions between metal ions from the matrix, e.g. copper ions, and metal ions in the magnetic particles, e.g. iron and/or nickel ions; (3) they dissolve the matrix without any significant dissolution of the magnetic particles; and (4) they preferably assist in forming a passive layer about each magnetic particle. Passivation of the magnetic particles is desirable to prevent further oxidation and corrosion of the magnetic particles. Generally, a passive layer comprises an oxygen impervious barrier such as an oxide layer about each particle. It is quite important that any passive layer about each particle not be disturbed by the dissolution solution. Still further, these dissolution solutions have been found to be useful with either electrolytic or chemical recovery techniques.

Solutions in accordance with the present invention include aqueous solutions containing inorganic complexing agents, such as ammonia, cyanide and/or pyrophosphate, and/or organic complexing agents, such as formates, acetates and/or citrates. Solutions containing ammonia have been found to be quite useful in chemical extraction techniques, while solutions containing organic complexing agents have been found to be particularly useful in electrolytic recovery techniques.

The organic complexing agents used in the solutions of the present invention preferably comprise a substituted alkyl- or aryl- compound with at least one carboxylic acid group compound. If desired, the organic complexing agent solution may contain at least one additional constituent selected from the group consisting of hydroxy- and carboxy- group compounds. The carboxy group constituent may be a free acid or a water soluble salt such as an alkaline metal salt or an ammonium salt. In those situations where it is desired to plate a particular metal onto an electrode, the solution may contain a salt of the metal to be plated. For example, the dissolution solution used to electrolytically dissolve the above-described copper-rich matrix may contain a copper salt, such as copper sulfate, preferably in a concentration greater than about 0.3 M.

It has been discovered that aqueous citrate solutions are particularly useful in electrolytically extracting magnetic particles from a surrounding matrix. They have been found to be extremely useful in extracting the iron-nickel rich magnetic particles dispersed in the copper-rich matrix formed by thermally aging the copper-nickel-iron alloy system described above. This is because citrate solutions tend to be stable and tend to form a passive layer about the particles. Suitable citrate solutions include those that contain a citrate ion concentration in the range of about 0.5 M to about 3 M. Preferred solutions are those that contain a citrate ion concentration in the range of about 1 M to about 2 M. The solutions of the present invention may be made up from an alkaline metal citrate and/or citric acid. The solution may be prepared in any desired manner. The relative proportions of the constituents should be such that the solution has a pH greater than about 3, preferably greater than about 4. If needed, a quantity of sodium or ammonium hydroxide may be added to obtain a desired pH level. As previously discussed, the solution may contain a copper salt such as copper sulfate. If present, the copper salt is preferably present in a concentration greater than about 0.3 M.

After the citrate solution has been prepared, it may be used as an electrolyte in an electrolytic cell containing two or more electrodes. If desired, the electrolyte may be continually fed into the cell at a flow rate in the range of about 5 cm/sec to about 50 cm/sec. To free the magnetic particles, the material containing the copper-rich matrix and the iron-nickel rich magnetic particles is immersed in the citrate solution electrolyte. An electrical current is passed between the electrodes in a known manner. The current may be applied with either a constant voltage or a constant current density. During electrolysis, the electrolyte may be kept at a temperature in the range of about room temperature to about 50° C. The cell may be provided with an appropriate heating/cooling loop to maintain the electrolyte at the desired temperature.

As the matrix anodically dissolves, the free magnetic particles may be collected in any desired manner. It is important to remove the magnetic particles, particularly from the surface of the electrode(s), so that they do not interfere with the dissolution of the anodic species, namely the matrix. The collected particles may be rinsed in water after removal from the electrolyte to remove any unwanted chemical contaminants.

Aqueous solutions containing free ammonia have been found to be particularly useful in chemically extracting the iron-nickel rich magnetic particles dispersed in the copper-rich matrix formed by thermally aging the aforementioned copper-iron-nickel alloy system. Useful solutions contain from about 0.5 M to about 3.5 M of free ammonia preferably in the form of at least one ammonium salt such as ammonium hydroxide and/or ammonium sulfate. Preferred solutions contain from about 1 M to about 2 M of free ammonia. The pH of these solutions is adjusted to be greater than about 8, preferably in the range of about 9 to about 11. If desired, the solution may also contain from about 10 g/l to about 50 g/l, preferably from about 20 g/l to about 40 g/l, of copper. The copper may be added in the form of a powder or a copper salt such as copper sulfate to assist the dissolution process. The solution may be prepared in any desired manner.

After the ammonia containing solution has been prepared, the material containing the copper-rich matrix and the iron-nickel rich magnetic particles is immersed therein. The solution may be used at a temperature from about room temperature to about 50° C. Any suitable means known in the art may be used to keep the solution at the desired temperature. As the matrix dissolves, the magnetic particles may be collected in any desired manner. The collected particles may be rinsed in water after removal from the solution to wash away any unwanted chemical contaminants.

The solutions of the present invention have also been found to be advantageous because they are generally non-toxic and do not require any special waste treatment facilities.

It has been discovered that the magnetic particles formed in conjunction with the present invention exhibit many of the characteristics desired for recording media. For example, they are acicular in shape and are characterized by a saturation magnetization greater than about 80 EMU/g, preferably greater than about 100 EMU/g, a coercive field in the range of about 300 Oe to about 2000 Oe, preferably from about 500 Oe to about 1500 Oe, and substantially uniform aspect ratios up to about 10:1, preferably in the range of about 1.5:1 to about 8:1. They are further characterized by a substantially uniform size, substantially uniform composition throughout and a relatively smooth surface. In addition, the particles are chemically stable, are single magnetic domain particles and exhibit a length in the of about 50 Å to about 2000 Å preferably from about 300 Å to about 1500 Å. As a result of these characteristics, the particles produced by the present invention tend to exhibit substantially uniform magnetic properties.

The ability to produce a particle having a relatively smooth surface is particularly significant in that such particles exhibit an increase in magnetization per unit volume and reduced noise. The ability to produce particles of a substantially identical nature is also important from the standpoint of reducing noise problems.

To form recording media, the magnetic particles are formed into a dispersion and coated onto an appropriate substrate material as a magnetic layer. The magnetic layer generally comprises a plurality of magnetic particles dispersed in a binder material such as a polyurethane. The magnetic layer may also contain a dispersant such as lecithin, a lubricant, conductive pigments, solvents and/or abrasives. The type of substrate material used of course depends upon the type of recording media to be formed. For example, the substrate material may be aluminum or an aluminum alloy for rigid media or a plastic material such as polyethylene terephthalate for flexible media. Any suitable method known in the art may be used to form the recording media. The particular method employed does not form part of the present invention.

To illustrate the present invention, the following examples were performed.

EXAMPLE I

An alloy having a composition consisting essentially of 20% iron, 20% nickel and the balance essentially copper was prepared. The alloy was homogenized at 1100° C. for 4 hours and rapidly cooled. The alloy was then cold rolled to 0.030″, heat treated at 1100° C. for 2 hours and rapidly cooled to insure homogeneity. The material was then thermally aged at 650° C. for 4 hours to effect decomposition of the homogenized material into ferromagnetic particles in a copper-rich matrix.

The copper-rich matrix was then dissolved using an aqueous ammonium hydroxide solution containing 3 M ammonium hydroxide, 0.25 M ammonium sulfate and 20 g/l copper. The magnetic particles were then recovered from the solution. The magnetic properties of the particles are given below and are compared with typical magnetic media.

|  | Saturation Magnetization (EMU/g) | Coercive Field (Oe) |
| --- | --- | --- |
| Extracted particles | 110 | 600 |
| $\gamma Fe_2O_3$ particles | 75 | 300 |
| Co-$\gamma Fe_2O_3$ | 73 | 550 |
| $CrO_2$ particles | 73 | 650 |

EXAMPLE II

Samples containing ferromagnetic particles in a copper-rich matrix were prepared as in Example I. The copper-rich matrix was electrolytically dissolved using an aqueous citrate solution. The aqueous citrate solution had a pH of 6 and contained 1 M sodium citrate and 0.3 M copper sulfate. The solution was kept at room temperature and provided to the electrolytic cell at a flow rate of 10 cm/sec. A potential of 1000 $mV_{SHE}$ or a current density of 35 mA/cm$^2$ was applied to electrodes immersed in the solution.

The magnetic particles were recovered from the solution and their magnetic properties were measured. The recovered particles exhibited a saturation magnetization in the range of 110 EMU/g to 120 EMU/g and a coercive field in the range of 580 Oe to 700 Oe.

While the solutions of the present invention have been discussed in the context of extracting magnetic particles, it should be recognized that they have other uses. For example, the solutions may be used to recover iron- or nickel-base materials from copper-base, iron-base or nickel-base composites.

While it is preferred that the thermal aging step be the final processing step before dissolution of the matrix, it may be necessary with some alloy systems to further cold work the material after the thermal aging treatment to assist the dissolution process.

The patents set forth in the specification are intended to be incorporated by reference herein.

It is apparent that there has been provided in accordance with this invention solution for extracting magnetic particles which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed:

1. A solution for extracting magnetic particles from a surrounding matrix by dissolving said surrounding matrix without significantly dissolving said magnetic particles comprising an aqueous citrate solution initially having a citrate ion concentration in the range of from about 0.5 M to about 3 M and a pH greater than about 3.

2. The solution of claim 1 further comprising:
   said citrate ion concentration being in the range of about 1 M to about 2 M and said pH being greater than about 4.

3. The solution of claim 1 further comprising:
   said citrate ions being present in the form of at least one of an alkaline metal citrate and citric acid.

4. The solution of claim 1 further including a concentration of copper greater than about 0.3 M.

5. A solution for extracting magnetic particles from a surrounding copper matrix by dissolving said copper matrix without substantially dissolving said magnetic particles comprising:
   an aqueous solution initially containing from about 0.5 M to about 3 M of at least one organic complexing agent selected from the group consisting of formates, acetates and citrates and a concentration of copper greater than about 0.3 M; and
   said solution having a pH greater than about 3.

6. The solution of claim 5 wherein said organic complexing agent comprises from about 0.5 M to about 3 M of a citrate selected from the group consisting of an alkaline metal citrate and citric acid.

7. The solution of claim 5 further containing an effective amount of at least one of sodium hydroxide and ammonium hydroxide for maintaining said pH at a desired level.

8. A process for producing free magnetic particles, said process comprising:
   providing a material having a plurality of magnetic particles surrounded by a matrix; and
   dissolving said matrix without significantly dissolving said magnetic particles by immersing said material in an aqueous citrate solution initially having a citrate ion concentration in the range of from about 0.5 M to about 3.0 M and a pH greater than about 3.

9. The process of claim 8 wherein said dissolving step further includes forming a passive layer about each said magnetic particle.

10. The process of claim 8 wherein said dissolving step comprises immersing said material in an aqueous solution having an initial citrate ion concentration in the range of about 1 M to about 2 M and a pH greater than about 4.

11. The process of claim 8 wherein said dissolving step further includes:
    providing at least two electrodes, each said electrode being at least partially immersed in said solution; and
    applying an electrical current between said electrodes.

12. The process of claim 8 further including maintaining said solution at a temperature in the range of from about room temperature to about 50° C.

* * * * *